Dec. 25, 1928.　　　　　　　　　　　　　　　　1,696,368
L. V. STROUSE
ELECTRICAL SHIFTING MECHANISM FOR CURTAINS
Filed Nov. 21, 1927　　　2 Sheets-Sheet 1

INVENTOR.
Louis V. Strouse,
BY
Geo. P. Kimmel
ATTORNEY.

Dec. 25, 1928.
L. V. STROUSE
1,696,368
ELECTRICAL SHIFTING MECHANISM FOR CURTAINS
Filed Nov. 21, 1927 2 Sheets-Sheet 2
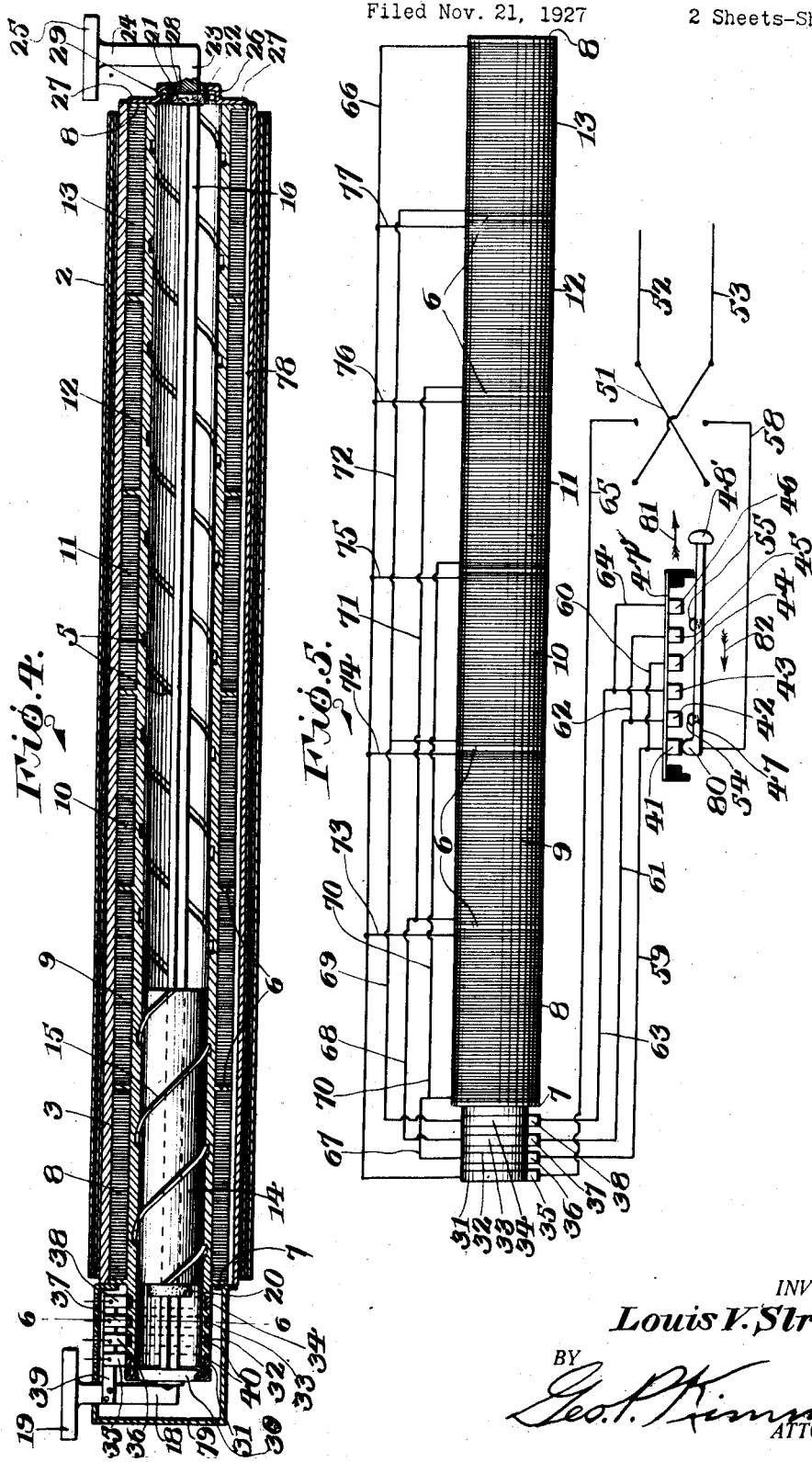
INVENTOR.
Louis V. Strouse,
BY
Geo. P. Kimmel
ATTORNEY.

Patented Dec. 25, 1928.

1,696,368

UNITED STATES PATENT OFFICE.

LOUIS V. STROUSE, OF LINWOOD, NEW JERSEY.

ELECTRICAL SHIFTING MECHANISM FOR CURTAINS.

Application filed November 21, 1927. Serial No. 234,824.

This invention relates to an electrically operated shifting mechanism for shades or curtains, and is designed primarily for use in connection with shades or curtains for the rear windows of automobiles of the closed body type, but it is to be understood that an electrically operated shifting mechanism, in accordance with this invention may be employed in any connection for which it is found applicable, and the invention has for its object to provide, in a manner as hereinafter set forth, an electrically operated shifting mechanism, normally in an open circuit and with the latter capable of being conveniently closed by the driver of the automobile to provide for the shifting of the rear shade or curtain body to the desired extent and for the purpose of excluding from the automobile the glare from headlights of automobiles approaching from the rear, under such conditions overcoming any difficulty in driving and reducing the possibility of accidents to a minimum.

Further objects of the invention are to provide, in a manner as hereinafter set forth, an electrically operated shifting mechanism for the purpose referred to which is simple in its construction and arrangement, strong, durable, compact, thoroughly efficient in its use, readily installed, conveniently thrown into active position, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 4 is a longitudinal sectional view of the mechanism and with a shade roller thereon.

Figure 5 is a diagrammatical view of the mechanism.

Figure 1:
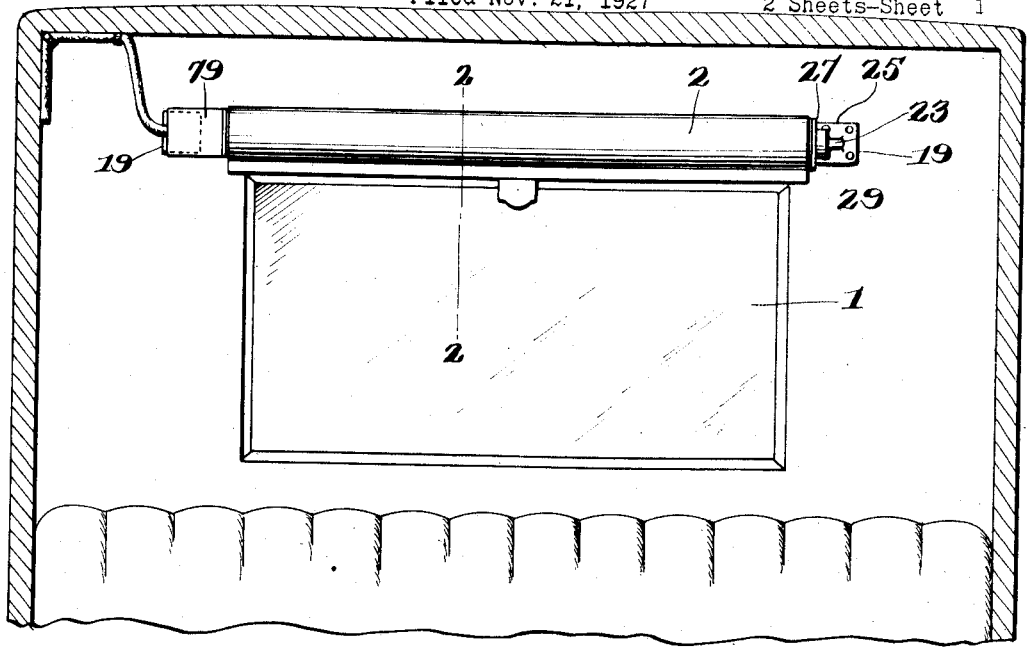
Figure 1 is a fragmentary view in section of an automobile body of the closed type and showing the adaptation with the rear window thereof of an electrically operated shifting mechanism for the curtain or shade body for the window.
Figure 2:
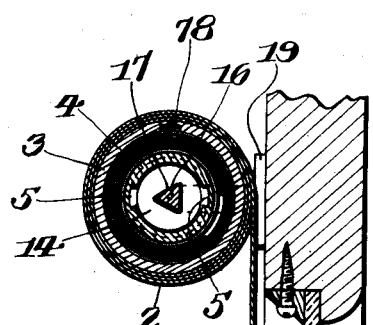
Figure 2 is a section on line 2—2 Figure 1.

Referring to the drawings in detail 1 denotes the rear window of an automobile and 2 the shade or curtain body for association therewith to close or partially close the same.

The shade or curtain body 2 is connected to and winds on and off a hollow roller 3 formed of insulation material.

Positioned within the roller 3, as well as being of greater length than the length of the latter, is a metallic tube 4 preferably constructed of aluminum. The inner face of the tube 4 from a point removed from one end thereof to its other end is formed with a spiral groove 5 of appropriate width and depth. One end of the roller 3 is flush with one end of the tube 4 and the latter projects a substantial distance from the other end of the roller 3 and that portion of the tube 4 which projects beyond an end of the roller 3 is not provided with the spiral groove 5. The roller 3 is separated or maintained in spaced relation with respect to the tube 4 by a series of spaced, peripheral, annular flanges 6 which are integral with the outer face of the tube 4. The outer flanges of said series are indicated at 7, 8 and they are flush with the ends of the roller 3. The tube 4 is adapted to be revolved, in a manner as hereinafter referred to, and bodily carries the roller 3 therewith, as the latter is connected with the tube 4 for the purpose of bodily moving therewith. The number of peripheral flanges, on the tube 4, can be as desired and the distance between such flanges can also be as desired, but as shown by way of example the number of peripheral flanges is seven and provide spaces for six solenoid coils indicated at 8, 9, 10, 11, 12 and 13.

Operating within the tube 4 is an iron core 14 common to the several solenoids and having its outer periphery provided throughout with a spiral rib 15 which travels in the groove 5 for the purpose of revolving the tube 4 when a solenoid is energized. The length of the core 14 is substantially one and one-half times as great as the length of a solenoid coil.

The mechanism includes a combined support and guide for the tube 4 and the core 14 respectively consisting of a rod 16 surrounded by and of greater length than the tube 4 and slidably mounted on the rod 16 is the core 14. The rod 16 is of polygonal cross sectional contour. The core 14 is formed with a bore 17, corresponding in contour to the shape of the rod 16 and which prevents the core 14 from revolving on the rod 16. The rod 16 projects from one end of the tube 4 and terminates in an arm 18, provided with a flange 19 adapted to be anchored to a support for the purpose of maintaining the rod 16 stationary. Fixed to the rod 16, in proximity to that end thereof which terminates in the arm 18, is a resilient abutment or stop 20 for the core 14. Connected to the other end of the rod 16 and arranged exteriorly of the tube 4 is a resilient abutment 21 which constitutes a stop for the core 14. Mounted on the abutment 21 is a cap 22 which encloses the former. The cap 22 is carried on the inner end of an inwardly extending arm 23 of a flanged supporting bracket 24. The flange of the bracket 24 is indicated at 25 and is adapted to be anchored to the support to which the flange 19 is secured. Enclosing the cap 22 is a flanged cap member 26 having its flange indicated at 27 and which is secured to the tube 4. The cap member 26 is provided with an opening 28 for the passage of the arm 23, and the latter constitutes a bearing. Interposed between the cap 22 and the cap member 26 are bearing balls 29 confined in any suitable manner within the space between said cap and cap member. The cap 22 acts as a support for the rod 16. Secured to the rod 16, in proximity to the arm 18 is a bearing member 30 for that end of the tube 4 opposite the end to which the cap member 26 is attached. The bearing 30 also constitutes a support for the tube 4.

The solenoid coils 8, 9, 10, 11, 12 and 13 are connected in series and parallel wound. The current is supplied to the coils by means of stationary collector rings, 31, 32, 33 and 34, preferably copper gauze brushes to lower resistance. When the coils are energized they act as a solenoid to attract the iron core 14 with the rib 15 of the latter traveling in the groove 5 formed on the inner face of the tube 4 thereby revolving the latter, and which in turn will carry the roller 3 therewith, under such conditions winding or unwinding the shade body, depending in what direction the tube 4 is revolved. As the core 14 is of greater length than the coil, it will partially project into a preceding coil, thereby causing less reluctance to the magnetic flux of the preceding coil. The groove and rib are arranged preferably one turn to the inch, thereby offering very little resistance mechanically to the core when the latter is shifted.

As illustrated four collector rings are employed and which are indicated at 31, 32, 33 and 34 provided respectively with integral lateral lugs 35, 36, 37 and 38, which are in the form of binding posts for connecting circuit wires therewith. The lugs are secured to a support 39, attached to and extended at right angles from the arm 18 and in a direction towards the roller 3. That part of the tube 4 which projects from the roller 3 is formed with spaced peripheral grooves 40 for the reception of the collector rings, which should be individually insulated. The rings are constructed in a manner so that they can be conveniently mounted in the grooves 40.

Figure 3:
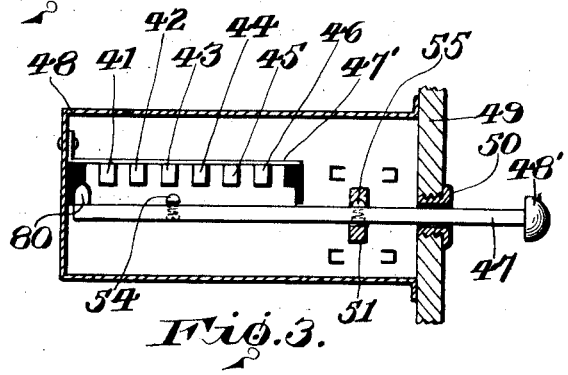
Figure 3 illustrates diagrammatically the controller element of the mechanism.
Figure 6:
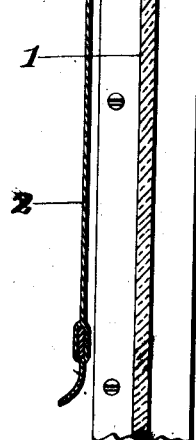
Figure 6 is a sectional detail illustrating one of the contact rings.

With reference to Figure 5 the circuit arrangement with respect to the solenoid coils is illustrated diagrammatically. A series of contacts corresponding in number to the number of the solenoid coils are indicated at 41, 42, 43, 44, 45 and 46 and said contacts are arranged in spaced relation and carried by a support 47'. Associated with the said contacts is a circuit opening and closing member 47. The support 47' is arranged in a suitable housing or boxing 48. See Figure 3. The support 47' is fixedly secured to the housing 48 and the latter is connected to the dash 49 and extends rearwardly therefrom. The dash 49 is provided with a flanged collar 50, which is secured thereto and through which extends the circuit opening and closing member 47 and the latter carries a knob 48'. The member 47 is positioned within convenient reach of the driver of the car. Within the housing 48 is arranged a reversing switch 51 connected with the feed wires 52, 53 leading from a suitable electrical source. The circuit opening and closing member 47 is provided with a pair of spaced actuating devices, 54, 55 for actuating the switch 51 to reverse the direction of the travel of the current. The actuating member or element 55 is provided for shifting the reversing switch so that the direction of the current will provide for the revolving of the roller 3 in a clock-wise direction and the actuating element 54 is employed to operate the reversing switch to change the direction of travel of the current to provide for the roller 3 to revolve in an anti-clock-wise direction. The circuit opening closing member 47 is electrically connected with the switch 51 and in Figure 5 a circuit connection 58 is shown for such purpose.

Extending from the contact 41 to the binding post 36 is a circuit connection 59 and extending from the contact 44 to the circuit connection 59 is a circuit connection 60. Extending from the contact 42 to the binding post 37 is a circuit connection 61 and extending from the contact 45 to the circuit connection 61 is a circuit connection 62. Extending from the contact 43 to the binding post 38 is a circuit connection 63 and extending from the contact 46 to the circuit connection 63 is a circuit connection 64. Extending from the switch 51 to the binding post 35 is a circuit connection 65. The circuit connections 59, 61 and 63 are attached to the lugs or binding posts 36, 37 and 38. Extending from the collector ring 31 to the core 13 is a circuit connection 66. Extending from the rings 32, 33 and 34 to the coils 8, 9 and 10 are circuit connections 67, 68 and 69 respectively and extending from the connections 67, 68 and 69 to the coils 11, 12 and 13 are circuit connections 70, 71 and 72 respectively. Extending from the coils 8, 9, 10, 11 and 12 to circuit connection 66 are circuit connections 73, 74, 75, 76 and 77 respectively. The roller 3 is slotted as at 78 for positioning the circuit connections which lead from the rings to the solenoid coils.

That end of the tube 4 which carries the collector rings is enclosed by a suitable housing or casing 79. The arm 18 extends through the rear of the casing 79. The circuit opening and closing member 47 is provided with a nose 80 for selectively engaging with the contacts 41 to 46 inclusive. When the circuit opening and closing member is moved in the direction of the arrow 81, Figure 5, the contact between the nose 80 thereof and any one of the contacts 41 to 46 will provide for the revolving of the roller in a clock-wise direction and when the circuit opening and closing member 47 moves in the direction of the arrow 82 and with the nose thereof engaging with any of the contacts 41 to 46 it will provide for the roller 3 to revolve in an anti-clock-wise direction. It is to be understood that the change of direction of the current is not had until the circuit opening and closing member 47 is at the limit of its shifting movement in either direction. The contacts 41 to 46 are spaced a sufficient distance apart so that the nose 80 can clear the contacts when desired. When the nose 80 is in engagement with a contact a solenoid coil will be energized and the core 14 attracted under such conditions the tube 4 will be revolved carrying the roller 3 therewith. The length of the tube 4 depends on the number of inches the shade body or curtain must travel up or down. The number of solenoid coils can be as desired.

The mechanism provides means whereby the rear curtain can be elevated or lowered when desired and without the driver of the car stooping or turning around in his seat, as the circuit opening and closing member will be in convenient reach of the operator.

It is thought the many advantages of a curtain shifting mechanism, in accordance with this invention, can be readily understood, and although the preferred embodiment of the invention is as illustrated and described, yet it is to be understood that changes in the details of construction can be had which will fall within the scope of the invention as claimed.

What I claim is:

1. A shade shifting mechanism comprising a roller for the shade, a revoluble means bodily carrying the roller and connected therewith, an electrically operated travelling iron core positioned within and interengaging with said means for revolving it in a clockwise and in an anti-clock-wise direction, and controlling means for said core.

2. A shade shifting mechanism comprising a roller for the shade, a revoluble means bodily carrying the roller and connected therewith, an electrically operated travelling iron core positioned within and interengaging with said means for revolving it in a clockwise and in an anti-clock-wise direction, controlling means for said core, and a supporting structure for said means, said structure including a guide for said element.

3. A shade shifting mechanism comprising a roller for the shade, a revoluble means bodily carrying the roller and connected therewith, an electrically operated travelling iron core positioned within and interengaging with said means for revolving it in a clockwise and in an anti-clock-wise direction, controlling means for said core, and a supporting structure for said means, said structure including a guide for said element, said element and guide having coacting means to prevent the revolving of said element during the travel thereof.

4. A shade shifting mechanism comprising a roller for the shade, a revoluble means bodily carrying the roller and connected therewith, an electrically operated travelling iron core positioned within and interengaging with said means for revolving it in a clockwise and in an anti-clockwise direction, controlling means for said core, and said controlling means including coacting elements to provide for changing the direction of travel of said travelling core.

5. A shade shifting mechanism comprising a roller for the shade, a revoluble means bodily carrying the roller and connected therewith, an electrically operated travelling iron core positioned within and interengaging with said means for revolving it in a clock-wise and in an anti-clock-wise direction, controlling means for said core, a supporting structure for said means, said structure including a guide for said core, and said controlling means including coacting elements to provide for changing the direction of travel of said travelling core.

6. A shade shifting mechanism comprising a roller for the shade, a revoluble means bodily carrying the roller and connected therewith, an electrically operated travelling iron core positioned within and interengaging with said means for revolving it in a clock-wise and in an anti-clock-wise direction, controlling means for said core, a supporting structure for said means, said structure including a guide for said core, said core and guide having coacting means to prevent the revolving of said core during the travel thereof, and said controlling means including coacting elements to provide for changing the direction of travel of said travelling core.

7. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, and controlling means for selectively energizing said coils to provide for the activity of the core.

8. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, controlling means for selectively energizing said coils to provide for the activity of the core, and means to provide a support for said tube, said means including a guide for said core.

9. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, controlling means for selectively energizing said coils to provide for the activity of the core, and means to provide a support for said tube, said means including a guide for said core, and said guide and core having coacting means to prevent the revolving of the core during the travel thereof.

10. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, controlling means for selectively energizing said coils to provide for the activity of the core, and said controlling means having coacting elements to provide for changing the direction of travel of the core.

11. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, controlling means for selectively energizing said coils to provide for the activity of the core, means to provide a support for said tube, said means including a guide for said core, and said controlling means having coacting elements to provide for changing the direction of travel of the core.

12. A shade shifting mechanism comprising a roller for the shade, a revoluble tube bodily carrying and secured to said roller, a plurality of solenoid coils carried by said tube, a travelling iron core common to said coils and arranged within and interengaging with said tube for revolving it in a clock-wise and in an anti-clock-wise direction, controlling means for selectively energizing said coils to provide for the activity of the core, means to provide a support for said tube, said means including a guide for said core, and said guide and core having coacting means to prevent the revolving of the core during the travel thereof, and said controlling means having coacting elements to provide for changing the direction of travel of the core.

13. In an electrical shifting mechanism for a window shade, a revoluble structure for winding and unwinding the shade and including a tube having its inner face formed with a spiral groove, electromagnetic devices carried by the tube and including a travelling iron core having a peripheral spiral rib operating in said groove for revolving said structure, and means for selectively energizing said devices to provide for the travel of the core to revolve said structure.

14. In an electrical shifting mechanism for a window shade, a revoluble structure for winding and unwinding the shade and including a tube having its inner face formed with a spiral groove, electro-magnetic devices carried by the tube and including a travelling iron core having a peripheral spiral rib operating in said groove for revolving said structure, means for selectively energizing said devices to provide for the travel of the core to revolve said structure, and said means including coacting elements for changing the direction of travel of the core.

15. In an electrical shifting mechanism for a window shade, a revoluble structure for winding and unwinding the shade and including a tube having its inner face formed with a spiral groove, electromagnetic devices carried by the tube and including a travelling iron core having a peripheral spiral rib operating in said groove for revolving said structure, means for selectively energizing said devices to provide for the travel of the core to revolve said structure, and bearing means for said structure.

16. In an electrical shifting mechanism for a window shade, a revoluble structure for winding and unwinding the shade and including a tube having its inner face formed with a spiral groove, electromagnetic devices carried by the tube and including a travelling iron core having a peripheral spiral rib operating in said groove for revolving said structure, means for selectively energizing said devices to provide for the travel of the core to revolve said structure, and supporting means for said structure, said supporting means including bearings for the structure and a guide for the core.

17. In an electrical shifting mechanism for a window shade, a revoluble structure for winding and unwinding the shade and including a tube having its inner face formed with a spiral groove, electromagnetic devices carried by the tube and including a travelling iron core having a peripheral spiral rib operating in said groove for revolving said structure, means for selectively energizing said devices to provide for the travel of the core to revolve said structure, said means including coacting elements for changing the direction of travel of the core, and supporting means for said structure, said supporting means including bearings for said structure and further including a guide for the core, said guide and core having coacting means to prevent the revolving of the core during the travel thereof.

In testimony whereof, I affix my signature hereto.

LOUIS V. STROUSE.